Aug. 2, 1966  J. TREFIL ETAL  3,263,960

SQUEEGEE DISC CONSTRUCTION FOR BUTTERFLY VALVES OR THE LIKE

Filed Aug. 2, 1963

Inventors.
James Trefil, &
Hubert L. Williams.
By Joseph O. Lange
Atty.

United States Patent Office 3,263,960
Patented August 2, 1966

3,263,960
SQUEEGEE DISC CONSTRUCTION FOR BUTTERFLY VALVES OR THE LIKE
James Trefil, Berwyn, and Hubert L. Williams, Hinsdale, Ill., assignors to Crane Co., Chicago, Ill., a corporation of Illinois
Filed Aug. 2, 1963, Ser. No. 299,661
2 Claims. (Cl. 251—306)

This invention relates generally to a butterfly valve construction, and, more particularly, it is concerned with a novel form of disc or closure member therefor.

In order to acquire a better appreciation of the benefits of this contribution, it should be understood that heretofore when butterfly valves were required in the handling of fine particles in a pipe line, as for example, beads of resin in solution in the flow lines, considerable difficulty has been encountered because the minute beads lodged between the disc and soft seat to cause fluid leakage. Also in many cases, the disc or closure member has become pitted of its entire surface, indicating contact with fluid other than water, and further such disc edge where it is sealed against the liner has been jagged and sharp from corrosion.

It is therefore a very important object of this invention to overcome the objections above referred to by providing the peripheral edge of the disc or closure member with a novel configuration which is best defined as a squeegee type, producing a type of action with respect to the inner periphery of the relatively soft seat of the valve similar to that produced by the edge of a windshield wiper blade in its movement over the surface of a windshield.

Another object of this invention is to provide a butterfly valve disc, which is preferably made integrally of metal, and is provided with the peripheral edge above referred to and which in normal service bears against the inner rubber-like periphery of the seat member constituting a portion of the butterfly valve casing.

Another object is to provide for a squeegee type of valve disc for butterfly valves in which a relatively simple pattern can be employed and in which the accompanying machining to finish such squeegee edge is accomplished with a minimum of inconvenience and expense.

Other objects and advantages will become more readily apparent upon proceeding with the following description read in light of the accompanying drawings, in which.

Similar reference numerals refer to similar parts throughout the several views.

Figure 1:
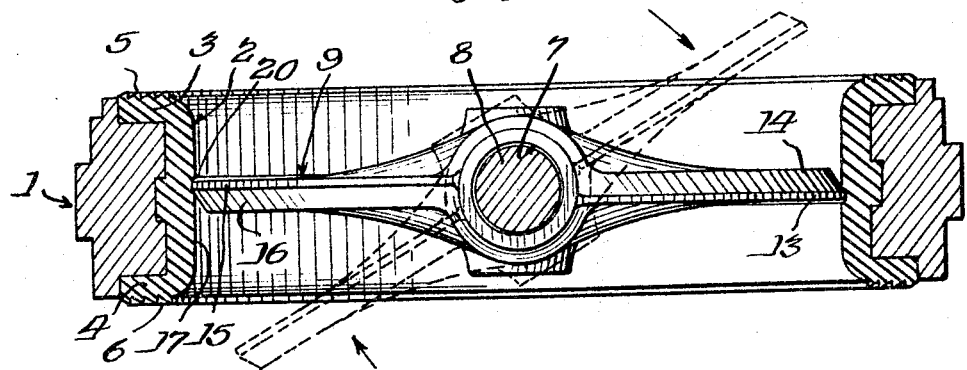
FIG. 1 is a fragmentary transverse sectional assembly view of the novel closure member embodying our invention applied to a conventional butterfly valve rubber-like relatively soft seat similar to that shown and described in connection with patent application Serial No. 177,402, filed March 5, 1962 and now Patent No. 3,173,650.
Figure 2:
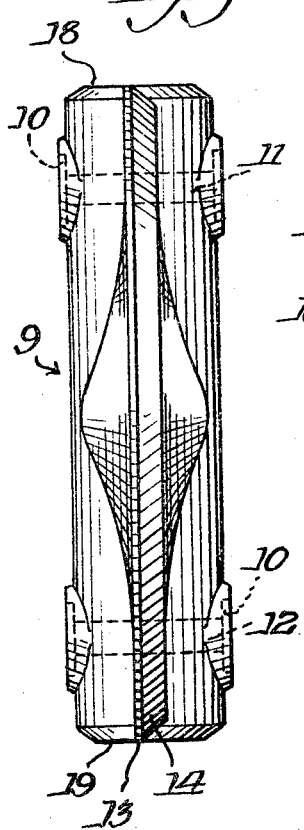
FIG. 2 is a side view of the novel closure member constituting the invention.

Referring now to FIG. 1, a substantially cylindrical wafer-like casing generally designated 1 is shown over which is fitted the annular seat generally designated 2 of a resilient soft material, such as rubber or other similar compositions, or plastics, having the side disposed annular portions 3 and 4 and at their outer portions being preferably, but not necessarily, serrated as at 5 and 6 for forming a leakproof connection with abutting flanges (not shown) constituting the means for attachment to a pipe line. The said casing 1 and the seat 2 at upper and lower portons thereof are bored as at 7, only the lower portion being shown to receive a stem or shaft 8 which for purpose of imparting rotary motion to the closure member generally designated 9 is pinned as at 11 and 12 to the said stem 8. The numeral 10 defines the recessed area in the closure member within which said pins are received.

At the upper end of the stem (not shown), a suitable actuating mechanism to impart rotative motion to the closure member is applied. However, since it has no significant part in the invention, it is deemed unnecessary to show and describe it.

Figure 3:
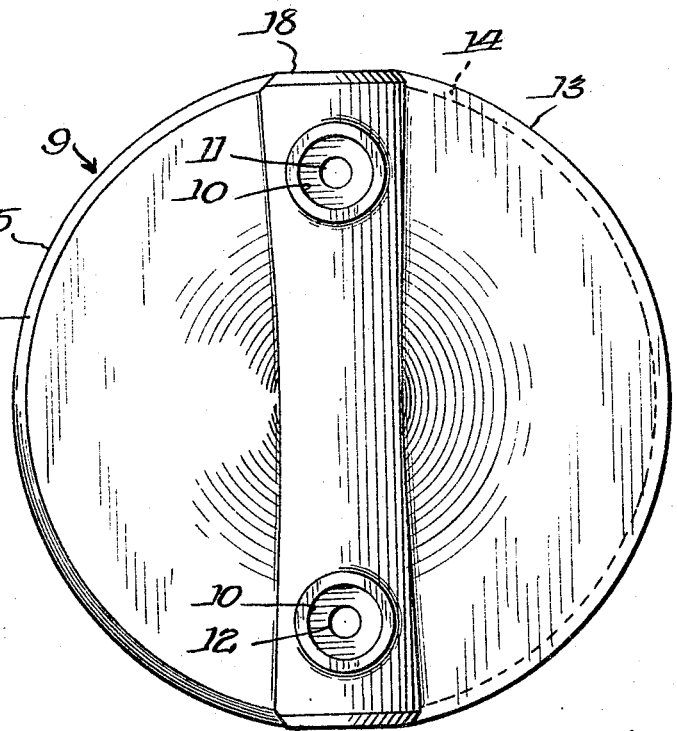
FIG. 3 is a front view of the disc shown in FIG. 2.

At the outset, in considering the particular contribution of this invention, it must be appreciated that the actuating mechanism for effecting the rotation of the stem 8 and the closure member 9 restricts the direction of rotation for closing the valve to the clockwise direction shown in the plan sectional view of FIG. 1 arrows. The dotted lines indicate the partially open position of the valve and the arrows show the direction in closing the valve. The direction indicated is important because the effectiveness of the construction in closing the valve tightly must follow the direction indicated. The significance of this construction, that is, the reason underlying its use is the closure member 9 on each side is provided at its peripheral semi-circular portion with the thin transverse annular surface 13 and rearwardly of or behind said surface with the inclined annular surface 14 also of substantially semi-circular configuration. On the opposite side of the vertical centerline of the closure member, the semi-circular and similar respective surfaces 15 and 16 are provided, the former being the narrow surface and latter being the inclined wider annular surface. It should therefore be understood that when the valve is being closed and thereby rotating in the direction indicated by the arrows the lead edges of the surfaces 13 and 15 respectively of the closure member will make the initial semi-circular contacts with the inner surface 17 of the valve seat 2. The term "lead" edges of the surfaces 13 and 15 is used because these edges actually lead into the initial contact with the seat 2 when the valve is closed. By directing attention to FIG. 3, it will be appreciated that the respective substantially semi-circular surfaces 14 and 16 and the lead edges of the respective surfaces 13 and 15 terminate at their inner portions with the flat upper disc surface 18 and with the flat lower disc surface 19 as shown more clearly in said figure.

Thus, it will be clear from the description hereinabove given that the peripheral edge of the closure member forms the novel feature of this invention in having a substantially square lead edge, a land formed by a relieved rear edge of surfaces 14 and 16.

As previously stated, with the rotation of the closure member in the valve closing direction indicated by the arrows, the valve closes the lead edges of surfaces 13 and 15 contacting the inner periphery 17 of the rubber seat as at 20, and squeegeeing such particles as for example resinous beads out of the way. Heretofore, where square leading edges had been used or angular leading edges or rounded leading edges have been used, the wear in the valve seat has been objectionably rapid.

In opening the valve, it will be appreciated that the annular surfaces 14 and 16 will lead or move outwardly of the rubber developing only normal wear thereto.

Many types of butterfly valves have previously been tried on this service, but none has performed with the success of the device embodying the novel edge and surface construction for the closure member hereinabove described.

It is to be appreciated that the manner in which the edges are provided around the periphery may of course vary slightly from the manner described and therefore the actual scope of the invention should be measured by the appended claims interpreted in light of the prior art.

We claim:
1. A butterfly valve disc closure member unsymmetrical when viewed in plan on its vertical axis, the closure mem- ber being substantially plate-like and having discontinuous thin transverse annular land surfaces at its peripheral semi-circular portions formed by a substantially square lead edge and by an edge of annular relieved inclined surfaces extending rearwardly of the said transverse land, the extent of the discontinuity of said transverse land being defined by spaced-apart upper and lower flattened outer portions on said closure member.

2. A butterfly valve, a relatively soft annular seat therefor, an unsymmetrical butterfly valve disc closure member when viewed in plan, the closure member having discontinuous thin transverse annular land surfaces at its peripheral semi-circular portions formed by a substantially square lead edge and by an edge of annular relieved substantially sloping surfaces extending rearwardly of the said land surfaces, the diameter of said narrow land surfaces being slightly larger than the inside diameter of said annular seat whereby in the valve closed position the said land surfaces of the said closure member displace outwardly an arcuate portion of said annular seat and make fluid sealing contact with said annular seat on opposite sides of the valve central axis.

References Cited by the Examiner
UNITED STATES PATENTS

| | | | |
|---|---|---|---|
| 2,673,708 | 3/1954 | Danks | 251—173 |
| 2,835,268 | 5/1958 | Dillberg et al. | 251—305 X |
| 3,043,557 | 7/1962 | Stillwagon | 251—306 |

FOREIGN PATENTS 583,610  9/1933  Germany.

M. CARY NELSON, *Primary Examiner.*
ARNOLD ROSENTHAL, *Examiner.*